(12) United States Patent
Sato

(10) Patent No.: US 7,712,118 B1
(45) Date of Patent: May 4, 2010

(54) BROADCAST PROGRAM RETRIEVAL APPARATUS

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 09/672,154

(22) Filed: Sep. 27, 2000

(30) Foreign Application Priority Data

Sep. 28, 1999 (JP) ................. P11-274322

(51) Int. Cl.
  G06F 3/00 (2006.01)
  G06F 13/00 (2006.01)
  H04N 5/445 (2006.01)
(52) U.S. Cl. .......................................... 725/53; 725/39
(58) Field of Classification Search ................... 725/52, 725/53, 38, 39, 61; 709/219; 707/10, 3, 707/1, 2
See application file for complete search history.

(56) References Cited

U.S. PATENT DOCUMENTS

| | | | | |
|---|---|---|---|---|
| 5,945,987 A | * | 8/1999 | Dunn | ......................... 345/718 |
| 6,134,547 A | * | 10/2000 | Huxley et al. | ................... 707/5 |
| 6,460,032 B1 | * | 10/2002 | Ludtke | ........................... 707/3 |
| 7,373,652 B1 | * | 5/2008 | Bayrakeri et al. | .............. 725/53 |
| 2001/0020298 A1 | * | 9/2001 | Rector et al. | ................... 725/50 |
| 2001/0056478 A1 | * | 12/2001 | Wheeler et al. | ............. 709/219 |
| 2002/0108127 A1 | * | 8/2002 | Lew et al. | .................... 725/142 |

FOREIGN PATENT DOCUMENTS

| | | |
|---|---|---|
| JP | 11-88862 | 3/1999 |
| WO | WO 9946922 A1 * | 9/1999 |

* cited by examiner

*Primary Examiner*—Christopher Kelley
*Assistant Examiner*—Usha Raman
(74) *Attorney, Agent, or Firm*—Frommer Lawrence & Haug LLP; William S. Frommer; Thomas F. Presson

(57) ABSTRACT

A broadcast program retrieval apparatus includes a data server having a database for storing broadcast program information. The data server has a function for searching the broadcast program information stored in the database. A user server stores the same information as the broadcast program information stored in the data server. The user server has a function for selecting a desired broadcast program from the stored broadcast program information. The user server searches the broadcast program information stored in the data server using a content keyword, such as the cast or the like. The desired broadcast program is selected from among broadcast programs based on program retrieval identification codes (event IDs) retrieved and extracted by the content keyword.

13 Claims, 2 Drawing Sheets

FIG. 3

| Syntax | No. of Bits | Identifier |
|---|---|---|
| event_information_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for(i=0;i<N;i++){         (1) | | |
|         event_id | 16 | uimsbf |
|         start_time     (2) | 40 | bslbf |
|         duration     (3) | 24 | uimsbf |
|         running_status | 3 | uimsbf |
|         free_CA_mode | 1 | bslbf |
|         descriptors_loop_length | 12 | uimsbf |
|         for(i=0;i<N;i++){ | | |
|             descriptor()     (4) | | |
|         } | | |
|     } | | |
|     CRC_32 | 32 | rpchof |
| } | | |

BROADCAST PROGRAM RETRIEVAL APPARATUS

BACKGROUND OF THE INVENTION

1. Field of the Invention

The present invention relates to broadcast program retrieval apparatuses, and more particularly relates to a broadcast program retrieval apparatus in which large amounts of broadcast program information is searched by an exclusive server, thereby reducing the amount of data on broadcast programs to be selected.

2. Description of the Related Art

Digital satellite broadcasting provides programs through an extremely large number of channels, unlike the case of analog broadcasting by broadcasting satellites (BSs). In the case of digital satellite broadcasting, the number of channels is very large, and a single channel provides many programs. Taken all together, the number of programs broadcast is very large. A viewer is thus required to have special skills in order to appropriately select a desired broadcast program from among such a huge number of broadcast programs, and it is often difficult for the viewer to retrieve a desired broadcast program.

Electronic program guide (hereinafter referred to as "EPG") data, that is, broadcast program information, is transmitted independent of information for the actually broadcast program. Based on the EPG data, the viewer can select a desired broadcast program.

For example, the EPG data displays channel numbers on the vertical axis, and time slots and program titles on the horizontal axis. The viewer can find out program information by positioning a cursor on a desired program cell using a remote control.

When the viewer sequentially selects program cells to select program information on many programs one after another, a long period of time is required to reach a desired program. In practice, it is therefore difficult to appropriately select the desired program.

In order to select the appropriate program, the EPG data is searched for the appropriate program using a keyword. In general, retrieval using a keyword, and particularly ambiguous retrieval, demands a large database and fast processing. In consideration of the expense, it is substantially impossible for an individual to perform such retrieval.

Therefore, the viewer is connected to a broadcast program retriever via communication lines such as telephone lines. The viewer gives a keyword for retrieving a desired broadcast program to the broadcast program retriever. The broadcast program retriever searches for the desired program and provides the viewer with information on the retrieval results.

When the viewer receives the entirety of the information on the retrieval results via the telephone lines and the like, detailed information on the broadcast program is generally transmitted, thus requiring a long communication period, which is expensive.

SUMMARY OF THE INVENTION

Accordingly, it is an object of the present invention to reduce the amount of data to an appropriate amount when a desired broadcast program is selected from extensive broadcast program information.

To this end, a broadcast program retrieval apparatus of the present invention includes a data server having a database for storing broadcast program information. The data server has a function for searching the broadcast program information stored in the database. A user server stores the same information as the broadcast program information stored in the data server. The user server has a function for selecting a desired broadcast program from the stored broadcast program information. The user server searches the broadcast program information stored in the data server using a content keyword. The desired broadcast program is selected from among broadcast programs based on program retrieval identification codes which are retrieved and extracted by the content keyword.

The data server and the user server may be connected via communication lines. The content keyword may be an element of content forming each broadcast program. Each program retrieval identification code may be included in an event identification region of an event information table appended to each broadcast program. The user server may only receive the program retrieval identification codes extracted by the data server, and may select the desired broadcast program based on the received program retrieval identification codes. The broadcast program information may be EPG information.

According to a broadcast program retrieval apparatus of the present invention, a content keyword for program retrieval from broadcast program information is supplied to a data server side. Of the retrieval results obtained by retrieving from a predetermined database in the data server, only program retrieval identification codes are transferred to a user server. The user server selects the broadcast program based on the program retrieval identification codes. Detailed data on the broadcast programs is not transferred from the data server to the user server side. Hence, the program can be retrieved without excessively increasing the amount of data to be communicated.

BRIEF DESCRIPTION OF THE DRAWINGS

FIG. 3 is a format diagram of a format for creating EPG data by the transmitter shown in FIG. 2.

DESCRIPTION OF THE PREFERRED EMBODIMENT

Figure 1:
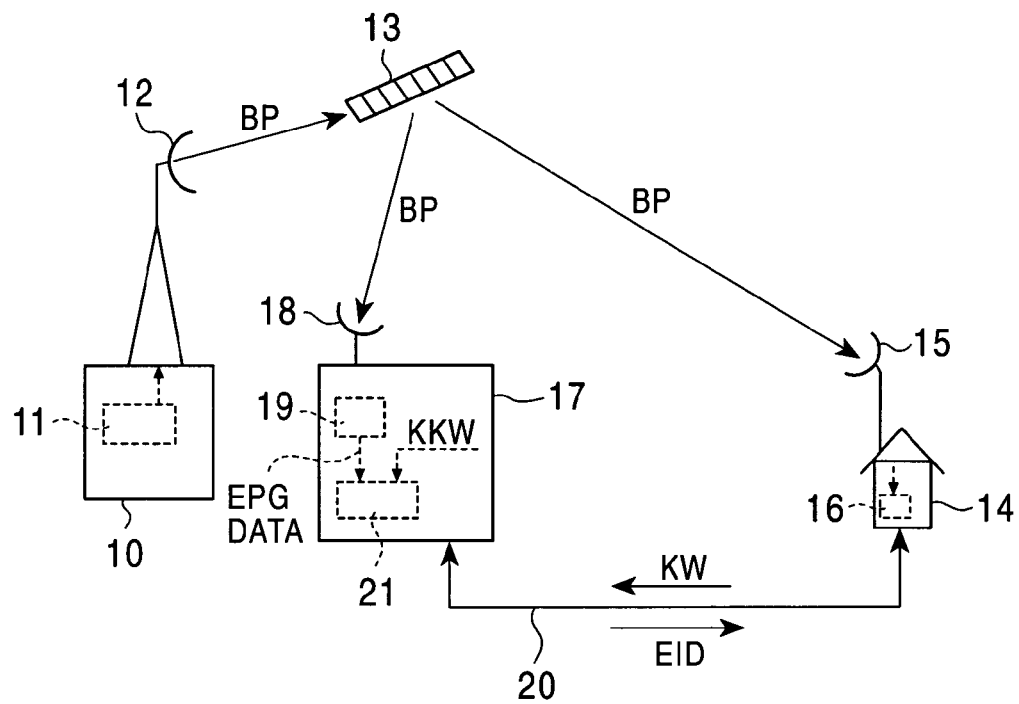
FIG. 1 is an illustration of a broadcast program retrieval apparatus according to an embodiment of the present invention.

The present invention will be understood from the following description of a broadcast program retrieval apparatus, according to an embodiment, taken in conjunction with the accompanying drawings. FIG. 1 shows the broadcast program retrieval apparatus of the embodiment.

Referring to FIG. 1, a broadcast station 10 transmits a broadcast program BP from a transmitter 11 through a transmitting antenna 12 to a digital satellite 13. The digital satellite 13 relays the broadcast program BP and transmits the broadcast program BP over digital waves to a predetermined area.

Figure 2:
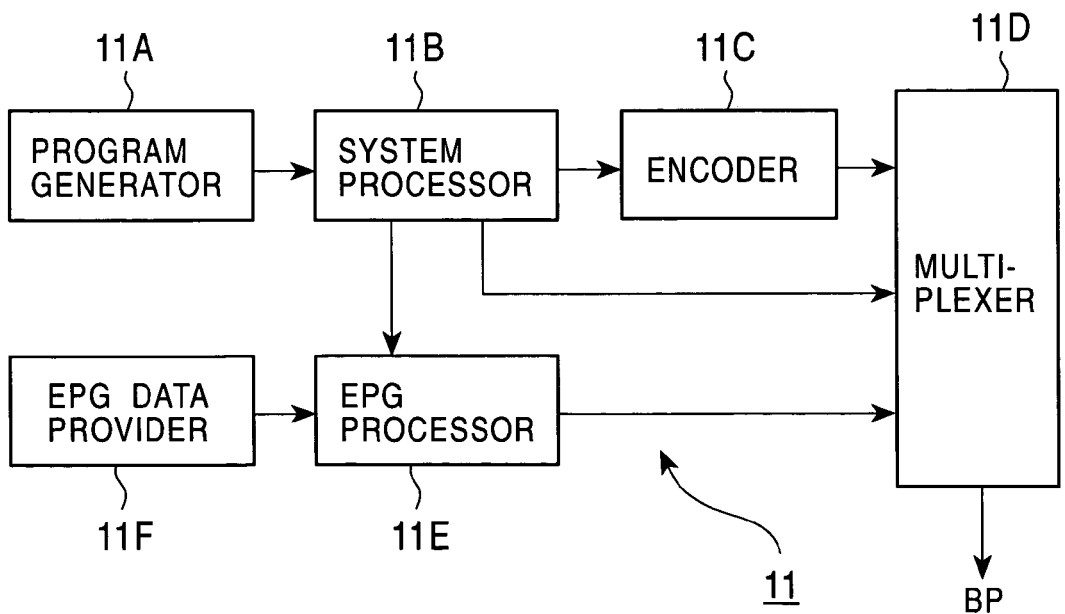
FIG. 2 is a block diagram of a transmitter of a broadcast station shown in FIG. 1.

Referring now to FIG. 2, when the transmitter 11 of the broadcast station 10 transmits the broadcast program BP, a program generator 11A generates program data including audio data and video data to be broadcast, and outputs the program data to a system processor 11B.

The system processor 11B provides an encoder 11C with the program data supplied from the program generator 11A, which is to be encoded by the encoder 11C. The system processor 11B generates a reference clock and time information and supplies the generated information to a multiplexer 11D and an EPG processor 11E.

Subsequently, the encoder 11C encodes the program data supplied from the program generator 11A through the system processor 11B using, for example, a Moving Picture Experts Group (MPEG) system, and outputs the encoded program data to the multiplexer 11D.

In contrast, an EPG data provider 11F generates EPG data on programs which are scheduled to be broadcast for two weeks, and supplies the EPG data to the EPG processor 11E. The EPG data is generated in a format described hereinafter.

The EPG processor 11E processes the EPG data in accordance with the reference clock and the time information, and outputs the processed EPG data to the multiplexer 11D. The multiplexer 11D forms the program data supplied from the encoder 11C and the EPG data supplied from the EPG processor 11E into packets and synthesizes a transport stream. The transport stream is transmitted as the broadcast program BP to the digital satellite 13.

The EPG data is created using a format as shown in FIG. 3. The format is specified by an event information section, that is, an event information table, specified by Digital Video Broadcasting (DVB).

As shown in FIG. 3, each syntax is described in a predetermined language form. The number of bits and an identifier to be allocated to each syntax are specified.

For example, syntax (1) includes an event id EID (event_id) 1 which is a program retrieval identification code included in an event identification region. Syntax (2) includes a broadcast starting time (start time). Syntax (3) includes a broadcast duration (duration). Other EPG data is included in other syntax. The number of bits and an identifier which can be described by each syntax are specified. Syntax (4) includes a descriptor portion (descriptors_loop_length) in which a title, a genre, and other necessary detailed descriptions can be entered.

In the EPG data created in this format, for example, a different event ID EID is given to a rebroadcast program which has the same content as the original program. In other words, a program which has the same title as another program and which is broadcast in a different time slot is given a different event ID EID. By specifying a program by the event ID EID, the program is conveniently retrieved.

Accordingly, the broadcast program BP is broadcast by the digital satellite 13. A receiver 16 in a user server 14 receives the broadcast program BP through a receiving antenna 15. Simultaneously, a receiver 19 in a data server 17, that is, a broadcast program retriever, receives the broadcast program BP through a receiving antenna 18. The EPG data is downloaded to predetermined storage media of the receivers 16 and 19, respectively.

At the receiver 16 side, in response to a command from a remote control of the user server 14 issued by a viewer, a processor controls a tuner so that the tuner receives a signal from a predetermined transponder of the digital satellite 13. The received signal is demodulated into a demodulated signal, and the demodulated signal is output to a demultiplexer.

The demultiplexer extracts audio data, video data, and EPG data from the demodulated signal. The audio data is packet-decoded by an audio decoder, and the video data is packet-decoded by a video decoder. The audio data and the video data undergo necessary processing and are then played and displayed by a monitor.

In contrast, under the control of the processor, the EPG data is supplied from the demultiplexer and is stored in an EPG data memory. In response to a selection command from the remote control of the user server 14 issued by the viewer for selecting broadcast program information BPI, the EPG data stored in the EPG data memory is read.

Subsequently, the EPG data undergoes necessary processing, is converted into image data, and is displayed as an EPG image on the monitor.

Accordingly, the viewer who uses the user server 14 can obtain the displayed EPG data. It is difficult for the viewer to directly select a desired program from among numerous programs. When the viewer who uses the user server 14 wants to watch a desired program on which a certain entertainer appears and which concerns a certain item, the viewer selects a few content keywords KWs concerning these preferences for program retrieval from among a single element forming content of the broadcast programs BP which are broadcast. These content keywords KWs are transmitted to the data server 17 via a telephone line 20.

In response to a request from the viewer who uses the user server 14, the data server 17 uses the EPG data which is the broadcast program information BPI and a unique database 21 having keywords KKWs uniquely appended by the data server 17 and efficiently performs retrieval using retrieval software. The data server 17 selects programs which satisfy the preferences of the viewer who uses the user server 14. The retrieval result is sent to the viewer who uses the user server 14 as a reply through the telephone line 20 using the event IDs EIDs which are the program retrieval identification codes included in the EPG data.

When a certain entertainer has changed his/her name in the past and now has a different name, the unique database 21 used by the data server 17 stores his/her record including the past record. It is thus possible to search, for example, all drama programs, including past drama programs, in which the entertainer appears. Compared with retrieval performed by the viewer who uses the user server 14, it is possible to perform accurate retrieval.

The reply to the viewer who uses the user server 14 does not include all data including the titles of programs and detailed descriptions of the programs. Instead, the reply only includes the event IDs EIDs (event_id) of the programs, which are the program retrieval identification codes. The viewer who uses the user server 14 can obtain information on a desired program from the data server 17 by receiving a small amount of data from the data server 17.

The viewer using the user server 14 who received the event IDs EIDs had already received the same broadcast programs BPs as those in the data server 17. The reply to the viewer included the event IDs EIDs as the retrieval result. The EPG data included in the broadcast programs BPs is displayed on the monitor, and the viewer uses the event IDs EIDs to select a program. Therefore, the user is permitted to know the desired program and the entire information on the program.

Accordingly, the data server 17 quickly performs appropriate program retrieval by using the unique database and a computer which has a fast computing speed and uses advanced algorithms. This provides special services which cannot be obtained by program retrieval by the viewer who uses the user server 14.

Although the present invention has been described hereinabove with reference to the preferred embodiment thereof in which broadcasting is performed by the digital satellite, it is to be understood that the invention is not limited to such embodiment alone, and a variety of modifications may be made as well. For example, broadcasting may be performed by terrestrial broadcast or by cable, such as by cable television (CATV).

What is claimed is:

1. A broadcast program retrieval system for retrieving a desired broadcast program among a plurality of broadcast programs, comprising:

a data server including a database configured to receive and store broadcast program information, and at least one function for searching the broadcast program information, which includes at least one program retrieval identification code and other information related to broadcast programs, wherein the program retrieval identification code is a function of content and a time slot; and a user server configured to receive and store the broadcast program information, said user server operating to send to the data server at least one content keyword for searching the broadcast program information for the desired broadcast program, wherein said user server is configured to receive from the data server only program retrieval identification codes, wherein the user server that receives the program retrieval codes previously received the broadcast program information, and wherein each program identification code is included in an event information table appended to the broadcast program information, and wherein only a select number of program retrieval identification codes are received, each of the program retrieval identification codes related to said at least one content keyword as a result of the searching by the data server, wherein said broadcast program information stored on said data server is identical to said broadcast program information stored on said user server, and wherein the select number of program retrieval identification codes received from the data server enables said user server to retrieve a select number of broadcast program information stored in the user server, and allows a user to review the select number of broadcast program information and to select the desired broadcast program from among a select number of broadcast programs corresponding to the reviewed select number of broadcast program information, said broadcast programs broadcast by digital satellite.

2. A broadcast program retrieval system according to claim 1, further comprising
a communication link configured to connect said data server and said user server.

3. A broadcast program retrieval system according to claim 1, wherein said at least one content keyword includes an element of content forming each broadcast program.

4. A broadcast program retrieval system according to claim 1, wherein the program retrieval identification codes are included in an event identification region of an event information table appended to each broadcast program.

5. A broadcast program retrieval system according to claim 1, wherein the broadcast program information includes electronic program guide (EPG) information.

6. A broadcast program retrieval system according to claim 1, wherein each of said at least one program retrieval identification code is assigned a different identification number even when a first broadcast program identified by a first program retrieval identification code is a rebroadcast of a second broadcast program, such that the second program broadcast program is assigned a second program retrieval identification code.

7. A broadcast program retrieval system according to claim 1, further comprising:
a keyword database in the data server, said keyword database including a plurality of keywords used to match said at least one content keyword received from the user server.

8. A broadcast program retrieval method for retrieving a desired broadcast program among a plurality of broadcast programs, comprising:

configuring a user server to receive and store broadcast program information, which includes at least one program retrieval identification code and other information related to said plurality of broadcast programs, wherein the program retrieval identification code is a function of content and a time slot;

configuring a data server to receive and store the broadcast program information, wherein the user server that receives the program retrieval codes previously received the broadcast program information, and wherein each program identification code is included in an event information table appended to the broadcast program information, wherein said broadcast program information stored on said data server is identical to said broadcast program information stored on said user server;

transmitting from the user server to the data server at least one keyword;

searching the broadcast program information in the data server using at least one searching function;

transmitting from the data server to the user server only program retrieval identification codes, wherein only a select number of program retrieval identification codes are transmitted, each of the program retrieval identification codes related to said at least one keyword;

retrieving a select number of broadcast program information stored in the user server using the select number of program retrieval identification codes received from the data server;

reviewing the select number of broadcast program information; and selecting the desired broadcast program from among a select number of broadcast programs corresponding to the reviewed select number of broadcast program information, wherein said broadcast programs broadcast by digital satellite.

9. A broadcast program retrieval method according to claim 8, wherein each of said at least one program retrieval identification code is assigned a different identification number even when a first broadcast program identified by a first program retrieval identification code is a rebroadcast of a second broadcast program, such that the second program broadcast program is assigned a second program retrieval identification code.

10. A broadcast program retrieval method according to claim 8, further comprising:
configuring a keyword database in the data server, said keyword database including a plurality of keywords; and
using said plurality of keywords to match said at least one content keyword received from the user server.

11. A broadcast program retrieval method according to claim 10, further comprising:
processing and storing in the keyword database any changes made to said other information related to said plurality of broadcast programs.

12. A broadcast program retrieval method according to claim 11, wherein said other information related to said plurality of broadcast programs includes a list of performers appearing on each of said plurality of broadcast programs.

13. A broadcast program retrieval method according to claim 8, further comprising:
selecting an appropriate function from said at least one searching function, wherein said appropriate function satisfies user preferences reflected in said at least one content keyword.

* * * * *